United States Patent
Takata

(10) Patent No.: US 6,474,608 B1
(45) Date of Patent: Nov. 5, 2002

(54) FIXTURE OF AN ARTICLE

(75) Inventor: Tetsuo Takata, Toyama (JP)

(73) Assignee: Takata Design Labo Company, Toyama (JP)

(*) Notice: Subject to any disclaimer, the term of this patent is extended or adjusted under 35 U.S.C. 154(b) by 0 days.

(21) Appl. No.: 09/537,431

(22) Filed: Mar. 27, 2000

(30) Foreign Application Priority Data

Mar. 29, 1999 (JP) .......................................... 11-086387

(51) Int. Cl.⁷ .............................................. F21V 35/00
(52) U.S. Cl. .................. 248/217.2; 248/304; 411/457; 411/471; 411/473
(58) Field of Search ................... 411/469, 471, 411/472, 473, 920, 457; 248/217.2, 217.3, 218.1, 304

(56) References Cited

U.S. PATENT DOCUMENTS

| | | | |
|---|---|---|---|
| 919,631 A | * 4/1909 | Page ........................ 411/471 |
| 2,201,138 A | * 5/1940 | Hyde ...................... 248/217.2 |
| 4,637,194 A | * 1/1987 | Knowles ................. 411/471 X |
| 4,988,249 A | 1/1991 | Kardefeldt et al. |
| 5,423,857 A | * 6/1995 | Rosenman et al. ..... 411/457 X |
| 6,086,606 A | * 7/2000 | Knodel et al. |

FOREIGN PATENT DOCUMENTS

| | | |
|---|---|---|
| JP | 62-78181 | 5/1987 |
| JP | 62-197978 | 12/1987 |
| JP | 63-10978 | 1/1988 |
| JP | 63-10979 | 1/1988 |
| JP | 63-59579 | 4/1988 |
| JP | 63-176547 | 7/1988 |
| JP | 02017207 A | 1/1990 |
| JP | 02221708 A | 9/1990 |
| JP | 09317728 A | 12/1997 |

* cited by examiner

*Primary Examiner*—Korie Chan
(74) *Attorney, Agent, or Firm*—Armstrong, Westerman & Hattori, LLP

(57) ABSTRACT

A reusable fixture for articles which can be pushed in and pulled out manually, and which shows no deformation after being pulled out. A pin is formed in such a fashion that a pair of inserting blades are respectively supported rotatably on a pivot, in the vicinity of one end, a, of the respective blades, symmetrical bend sections being formed in the respective blades at positions towards the center thereof from the aforementioned ends, a, and the other ends thereof forming inserting sections. The inner and outer edge regions of the inserting section have a linear shape or a curved shape. A cap for holding the pivot is attached to the pin, and a knob section is formed on the cap. A thin plate-shaped washer having a hole through which the inserting blades are inserted is used in combination with the pin.

7 Claims, 20 Drawing Sheets

FIG.3E
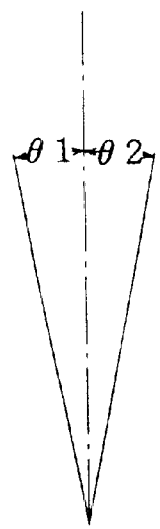
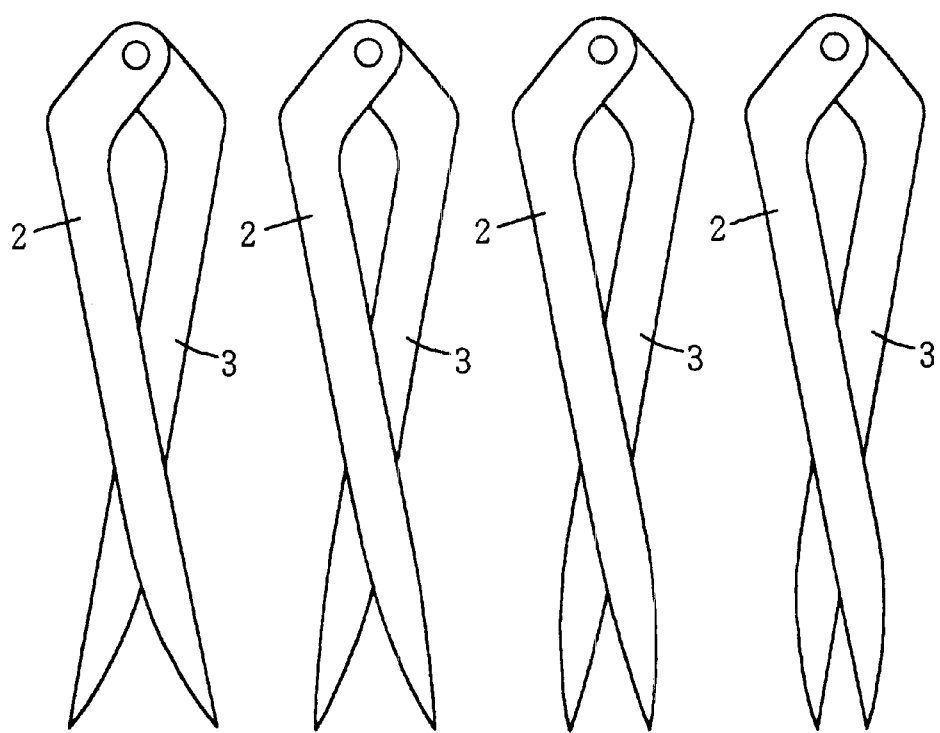
FIG.3A  FIG.3B  FIG.3C  FIG.3D

FIXTURE OF AN ARTICLE

BACKGROUND OF THE INVENTION

1. Field of the Invention

The present invention relates, principally, to a fixture for attaching articles of various types to a wall surface, ceiling, or the like, made of a light and weak board, such as plaster board, aerated light concrete (ALC), rock wool sound absorption board, insulation board, or the like, and more particularly, it relates to a fixture whereby articles of various types can be attached to wooden side walls, external siding boards, mortar walls in a semi-hardened state, or the like, by means of a tool such as a hammer, or the like.

2. Description of the Prior Art

Conventionally, thumb tacks are commonly used as fixtures for attaching articles to plaster board, for example. A thumb tack has a simple structure and is also very easy to use, since it can simply be pushed in with a finger, but-it provides a weak force in holding an article, and generally can only be used for attaching light-weight articles, such as paper articles, or the like. Consequently, there is a requirement for a fixture which has a simple structure, like a thumb tack but provides strong article holding power.

OBJECT AND SUMMARY OF THE INVENTION

It is an object of the present invention to provide a fixture for articles which provides strong article holding force, and which is light in weight, like a thumb tack, and is reusable and easy-to-use, in other words, a fixture which can be pushed in manually, without using a hammer, or the like, and when detached, can be pulled out manually, without using a tool, the constituent elements thereof being unchanged after detachment.

In order to achieve the aforementioned object, a fixture for articles according to a first aspect of the present invention comprises: a pin consisting of a single pivot and a pair of inserting blades, one end of each inserting blade being supported rotatably by means of the pivot and the other ends thereof being formed into sections for inserting into a board; and a washer having a hole through which the pair of inserting blades are passed; wherein the pair of inserting blades of the pin open up mutually when inserted into the board.

A fixture for articles according to this aspect of the invention can be inserted into a soft board, such as plaster board, manually, like a normal thumb tack, without using a hammer. Moreover, it can also be pulled out by a simple manual operation, like a conventional thumb tack, without using a tool, such as a pair of pliers, or the like. It is also possible to use the fixture according to the present invention in a hard board. This fixture displays no deformation after being detached, and it is reusable.

Moreover, if a small hole (for example, a 3.3 mm diameter hole) is provided in an article, then this article can be fixed by inserting the inserting blades through this hole. Moreover, when removing the fixture, since the effect of the pivot hinge causes the pair of inserting blades to follow the same course as the path they follow when inserted, then the inserting blades leave only a clean trace corresponding to their sectional shape, and there is virtually no damage to the surface of the board in the vicinity of the insertion trace.

The fixing strength provided by the fixture is very strong indeed compared to a thumb tack, for example. Moreover, when the fixture is removed from the board, there is no 'spring back' at the moment that the fixture leaves the board, and therefore safety is high, which is a major benefit. This fixture can also be applied to a small hole in the article.

A fixture for articles according to a further aspect of the present invention, comprises: a pin consisting of a single pivot and a pair of inserting blades, one end of each inserting blade being supported rotatably by means of the pivot and the other ends thereof being formed into sections for inserting into a board; wherein the pair of inserting blades of the pin open up mutually when inserted into a hole formed in the article.

According to this aspect of the invention, since the fixture is formed from a pin only, it is possible to provide a fixture for articles having a reduced number of constituent elements.

Preferably, the pair of inserting blades are elongated members which are bent in an intermediate position to form an approximate V shape. By forming the inner and the outer edge regions of the inserting sections respectively in a linear shape or a curved shape, it is possible to select the insertion angle and intersection angle of the inserting blades, and therefore the fixture can be made to cope with the hardness of the board and the required holding force.

Preferably the inner and outer edge regions of the aforementioned inserting section are formed respectively in a linear or curved shape. By attaching a cap for holding the pivot to the pin, and forming a knob region on said cap, it is possible to stabilize the attitude of the inserting blades and simplify the operation of pushing in and pulling out the fixture, whilst at the same time making it possible to improve design-related benefits by selecting an appropriate shape, color and material for the fixture.

Still preferably, a cap for holding the pivot is attached to the pin, and a knob region is formed on the cap.

BRIEF DESCRIPTION OF THE DRAWINGS

The foregoing object and features of the present invention will become apparent from the following description of the embodiments with reference to the accompanying drawings, wherein:

FIG. 3A–FIG. 3E are illustrative diagrams showing the variety of shapes of the inserting blades of a fixture according to the first embodiment;

DESCRIPTION OF THE PREFERRED EMBODIMENTS

A fixture according to a first embodiment of the present invention is now described with reference to FIG. 1 to FIG. 15.

Figure 1:
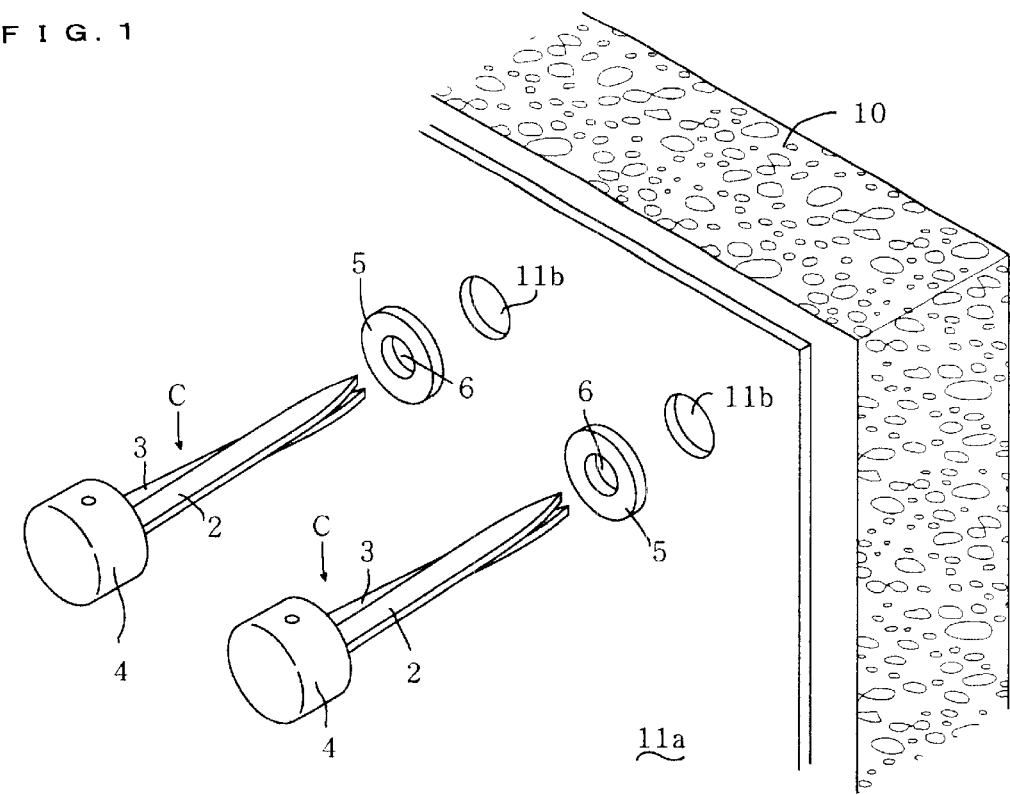
FIG. 1 is an oblique view of a fixture according to a first embodiment of the present invention.
Figure 2A:
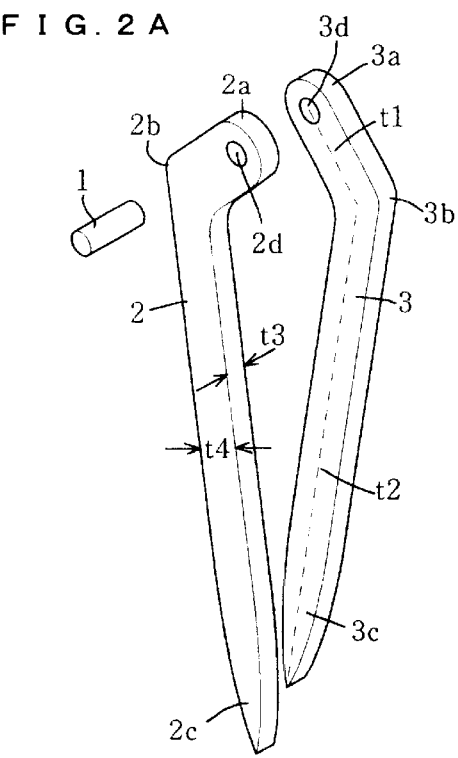
FIG. 2A is an exploded oblique view of an inserting blade of a fixture according to the first embodiment.

Firstly, a summary of the overall composition of a fixture for articles C is given with reference to FIG. 1 and FIG. 2A. The fixture for articles C consists of a pin P and a thin ring-shaped washer 5. The pin P comprises a single pivot 1 and a pair of inserting blades 2, 3.

The pivot 1 is made from a metallic material, such as stainless steel, or the like, and it is a rod-shaped member having a circular cross-section and a prescribed length. The inserting blades 2, 3 are elongated members, which are formed from a metallic material, such as stainless steel, or the like, by punching in a press.

The pair of inserting blades 2, 3 are elongated members, which are respectively bent at regions $2b$, $3b$ a short distance from one end $2a$, $3a$ thereof towards the other end thereof $2c$, $23$, in such a manner that they each have an approximate V shape. The one inserting blade 2 and the other inserting blade 3 have the same shape in a laterally symmetrical fashion.

Pivot holes $2d$, $3d$ are formed in the one end $2a$, $3a$ of each inserting blade 2, 3. By introducing the pivot 1 into these pivot holes $2d$, $3d$, the inserting blades 2, 3 are held rotatably on the pivot 1.

The other ends $2c$, $3c$ of the inserting blades 2, 3 are formed in such a manner that they decrease in width towards the respective tips thereof, thereby forming a portion for inserting into a board 10 (a structure having a wall surface onto which an article is to be fixed using the fixture C).

The washer 5 is a separate member from the pin. P and a hole 6 is formed in the center thereof, through which the aforementioned inserting blades 2, 3 pass.

A cap 4 for holding the pivot 1 is attached to the. pin P, and the cap 4 provides a knob section.

Figure 2B:
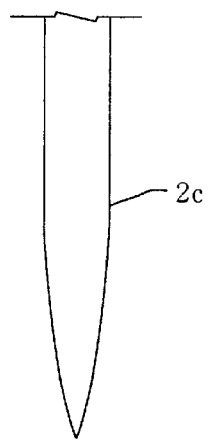
FIG. 2B is a side view showing a further example of an inserting section of an inserting blade in FIG. 2A.
Figure 4:
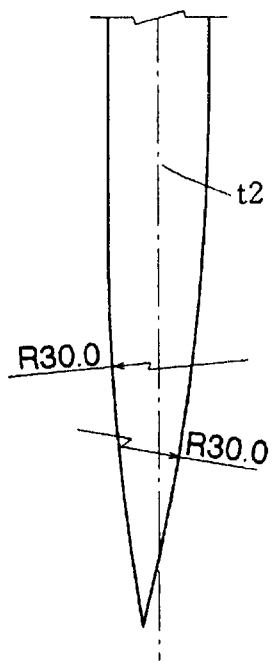
FIG. 4 is an illustrative diagram showing a further shape of a fixture according to the first embodiment.

As stated above, the inserting blades 2, 3 illustrated in FIG. 2A become narrower in width towards the tips at the aforementioned other ends $2c$, $3c$ thereof, but the thickness thereof remains the same from the ends $2a$, $3a$ to the other ends $2c$, $3c$ (in other words, throughout the length of the respective inserting blades 2, 3). However, as shown in FIG. 2B, in addition to making the inserting blades 2, 3 become narrower in width towards the tips at the other ends $2c$, $3c$ thereof, it is also possible to gradually reduce the thickness thereof. In this way, the force required for insertion is reduced to some extent.

Next, various possible shapes of the inserting blades 2, 3 are described with reference to FIG. 3A to FIG. 6. The inserting blades 2, 3 are curved on one side or both sides of the longitudinal cutting end faces thereof, the tips thereof being sharpened. Various shapes for this curvature may be adopted, as illustrated in FIG. 3A to FIG. 3D.

In other words, if the ends $2c$, $3c$ of inserting blade 2 or inserting blade 3 are formed with angles $\theta1$ and $\theta2$, as shown in FIG. 3E, then the blades shown in FIG. 3A have meeting inner edges which are substantially linear in shape, the outer edges thereof being curved (in other words, in the inserting blade 2, $\theta2 \approx 0$ and in the inserting blade 3, $\theta1 \approx 0$);

the blades shown in FIG. 3B have meeting inner edges which are approximately linear (having a large radius of curvature), in other words, in the inserting blade 2, $\theta1 > \theta2$, and in the inserting blade 3, $\theta1 < \theta2$, the outer edges thereof having a large curve;

the blades shown in FIG. 3C have meeting inner edges having a curve of relatively small curvature radius compared to the outer edges thereof, in other words, in the inserting blade 2, $\theta1 < \theta2$, and in the inserting blade 3, $\theta1 > \theta2$; and the blades shown in FIG. 3D have respective outer edges which are approximately linear in shape, the inner edges thereof having a curve, in other words, in inserting blade 2, θ1≈0, and in inserting blade 3, θ2≈0.

The various modifications of the blades illustrated in FIG. 3A to FIG. 3D are designed in such a manner that the tips thereof enter smoothly when the blades 2, 3 are inserted into the board 10, but for this purpose, it is also possible to adopt a composition whereby the tips of the blades 2, 3 are positioned eccentrically towards the open side from the center line t2 across the width of the inserting blade 2, 3, by forming the edges with curves of the same radius of curvature, but different lengths.

Figure 5:
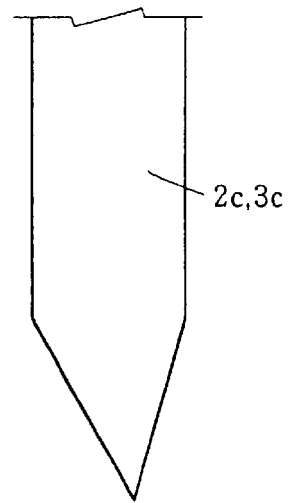
FIG. 5 is an illustrative diagram showing a further shape of a fixture according to the first embodiment.

As a further modification of the ends 2c, 3c of the inserting blades 2, 3, it is possible to form the edges with linear step sections, as illustrated in FIG. 5, instead of curved sections.

Figure 8:
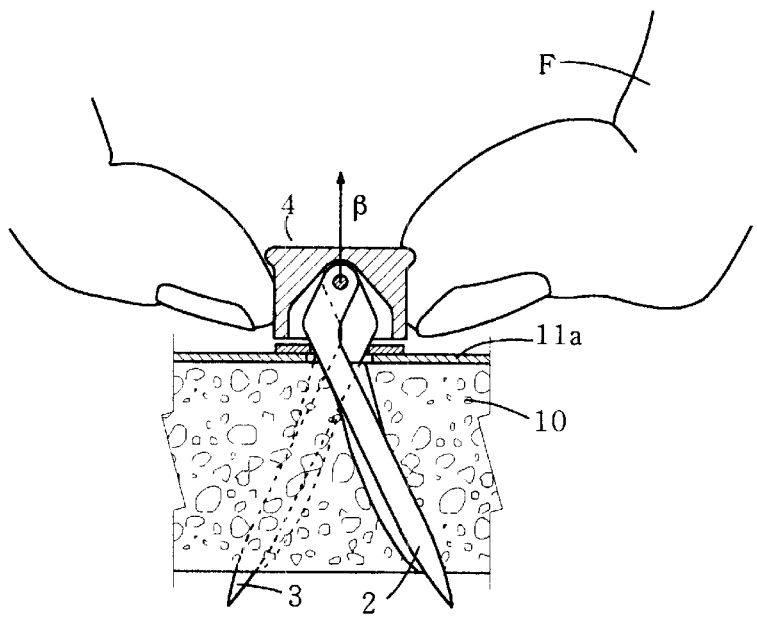
FIG. 8 is an illustrative diagram showing the removal of a fixture according to the first-embodiment.
Figure 12:
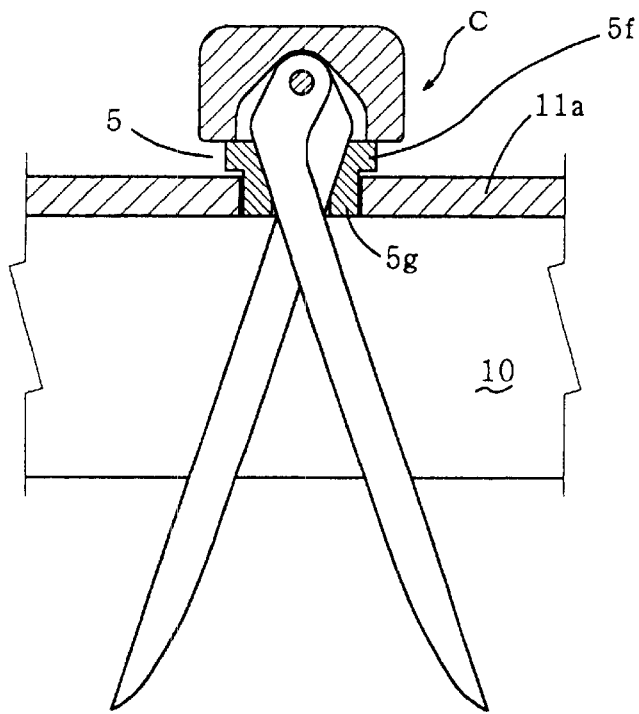
FIG. 12 is an illustrative diagram showing a further application example of a fixture according to the first embodiment.
Figure 13:
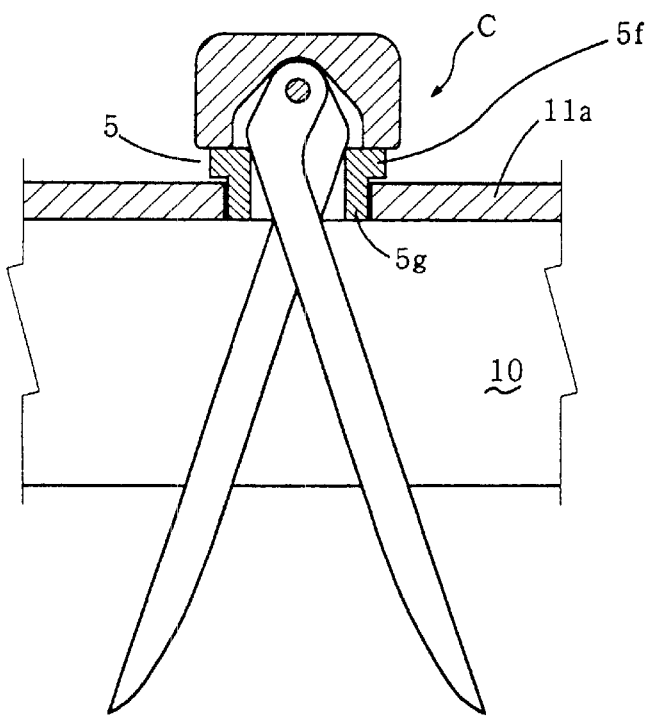
FIG. 13 is an illustrative diagram showing a further application example of a fixture according to the first embodiment.
Figure 14:
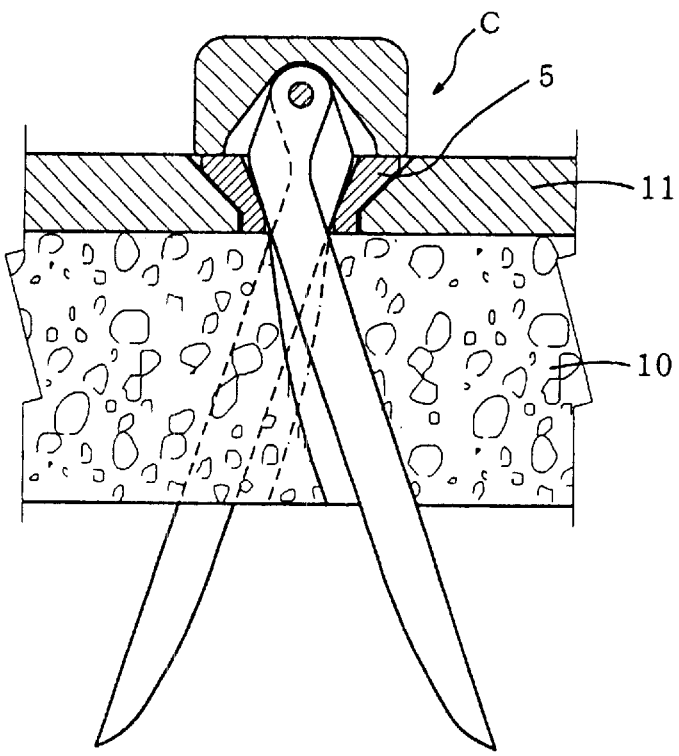
FIG. 14 is an illustrative diagram showing a further application example of a fixture according to the first embodiment.

Whatever shape is adopted for the ends 2c, 3c (inserting section) of the inserting blades 2, 3, desirably, they should be formed in such a manner that the respective tip portions thereof are opened as far as possible, when the inserting blades 2, 3 are completely inserted, in other words, when the upper portion of the outer edges of the inserting blades 2, 3 has abutted against the edge of the hole 6 in the washer 5, as illustrated in FIG. 8 or in FIG. 12–FIG. 14.

Figure 6:
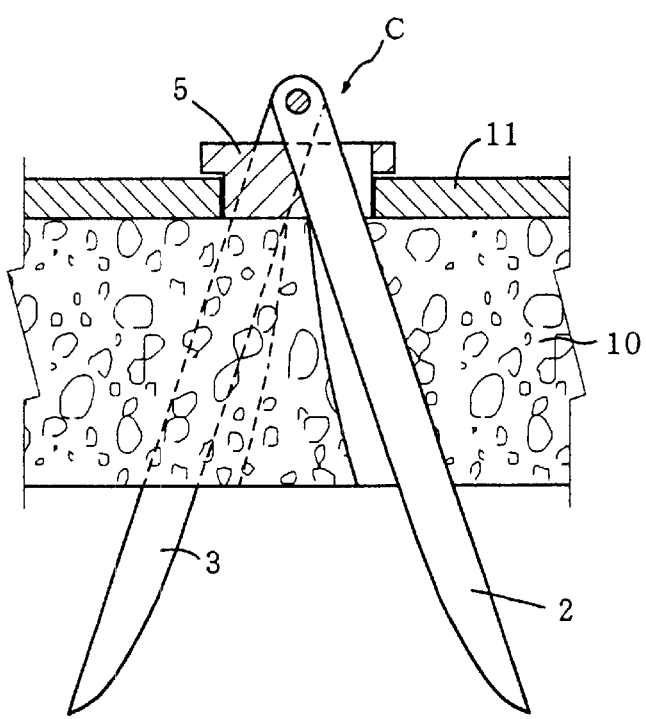
FIG. 6 is an illustrative diagram showing a further shape of a fixture according to the first embodiment.

As illustrated in FIG. 6, as a further embodiment of the inserting blades 2, 3, it is also possible to cause the inserting blades 2, 3 to open up by means of the shape of the ends 2c, 23, without forming bend sections 2b, 3b.

The pivot 1 is inserted into the pivot holes 2d, 3d formed in the inserting blades 2, 3, and the inner diameter of the pivot holes 2d, 3d is formed to approximately the same dimension as the outer diameter of the pivot 1, thereby causing the inserting blades 2, 3 to be coupled rotatably with respect to the pivot 1. In other words, two inserting blades 2, 3 are placed together in a laterally symmetrical fashion, the pivot holes 2d, 3d thereof are aligned and superposed, and a pin forming the pivot 1 is passed therethrough. The two inserting blades 2, 3 can be rotated about this pivot 1.

Next, the operation of attaching and detaching a fixture C is described with reference to FIG. 7 and FIG. 8.

A cap 4 is attached to the ends 2a, 3a of the inserting blades 2, 3. As illustrated in FIG. 1 or FIG. 7, the cap 4 is hat-shaped, the pivot 1 being positioned in an internal cavity section of the cap 4 and supported at both ends thereof.

Figure 7:
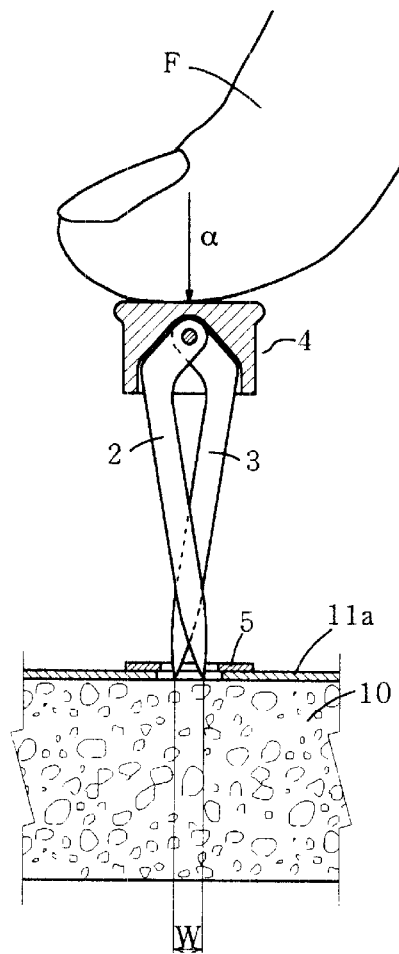
FIG. 7 is an illustrative diagram showing the installation of a fixture according to the first embodiment.

As illustrated in FIG. 7 and FIG. 8, the upper wall of the cavity section has a shape corresponding to the upper portion of the inserting blades 2, 3 from the ends 2a, 3a to the bend sections 2b, 3b thereof, whereby the opening width W of the front tips of the inserting blades 2, 3 is maintained at a constant dimension. In other words, it serves as a 'stopper' which limits the minimum value of the opening width W prior to insertion of the inserting blades 2, 3. If the upper circumferences of the ends 2a, 3a make contact with the upper wall of the cavity section, contact resistance is generated and the inserting blades 2, 3 become difficult to rotate, and therefore it is desirable if they do not make contact in this manner.

Moreover, in the embodiments illustrated in FIG. 9A to FIG. 10B, the inner wall section to the front and rear of the cavity section is formed in a shape corresponding to the shoulder portions of the bend sections 2b, 3b of the inserting blades 2, 3, thereby maintaining the opening width W of the front tips of the inserting blades 2, 3 at a uniform dimension.

Furthermore, the side wall regions of the aforementioned cavity section are narrow in width, and as illustrated in FIG. 9A to FIG. 10B, they form a gap whereby the two thin plate-shaped inserting blades 2, 3 are just able to rotate in a superposed state. In other words, the inserting blades 2, 3 are held by the side wall regions of the cavity section of the cap 4. The upper portion of the cap 4 serves as an area on which a finger F is put when the fixture is inserted, and the side circumference serves as a gripping section.

A washer 5 is used as an independent member from the pin P, as illustrated in FIG. 1 and FIG. 7. The washer 5 is formed by injection molding of a plastic material having excellent mechanical strength, such as polycarbonate resin, or formed by punching out thin sheet of a metallic material, such as stainless steel, using a press.

The washer 5 is round and has a hole 6 in the center thereof for inserting the aforementioned inserting blades 2, 3. Furthermore, the inner diameter of the hole 6 is set to a dimension whereby the outer edges of the inserting blades 2, 3 below the bend sections abut with the edge of the hole 6, when the inserting blades 2, 3 of the fixture C are inserted sufficiently into the board 10, as illustrated in FIG. 8, for example.

The actual size of a fixture C according to the first embodiment having the foregoing composition will now be described.

As shown in FIG. 2A, let t1 be the length of the center line of the inserting blade 3 from the pivot hole 3d (center of the hole) of the inserting blade 3 to the bend section 3b, 3b thereof, that is, the length of the central line parallel to the outer edge of the inserting blade 3; t2 be the length from the bend section 3b to the front tip (or, to the vicinity of the front tip in cases where the front tip is located eccentrically from the center line parallel to the outer edge), that is, the linear distance parallel to the outer edge; t3 be the thickness; and t4 be the width; then t1 is 2.8 mm, t2 is 20 mm, t3 is 0.7 mm and t4 is 1.3 mm (narrower section) to 1.5 mm (wider section), and the angle of bend of the bend sections 2b, 3b (namely, the angle between t1 and t2) is 120 degrees. Furthermore, the diameter of the pivot hole 3d is 1.1 mm, the diameter of the pivot 1 is 1.0 mm, and the length thereof is 5 mm (the same dimensions also apply to inserting blade 2).

Furthermore, the thickness of the washer 5 is 0.5 mm, the diameter thereof is 8 mm, and the diameter of the hole 6 is 3.3 mm. The cap 4 depends on the size of the inserting blades 2, 3, and the outer diameter thereof is 8 mm whilst the height thereof is 5.5 mm.

The respective dimensions of the various constituent elements are mutually related and should be designed respectively according to the mode of use.

Next, a method of using the fixture C for an article will be described.

When a surface sheet (article) 11a is to be fixed to a board 10 using a fixture C, as illustrated in FIG. 1 and FIG. 7, then the washer 5 is positioned at the fixing location, the tips of the inserting blades 2, 3 are placed inside the hole 6 of the washer 5, and the fixture C is pushed perpendicularly (in the direction a in FIG. 7) into the board 10, using a finger F.

By means of this pressing action, the fixture C can be inserted smoothly into the board 10, with little resistance, and without receiving significant reactive force in the lateral direction of the board cross-section, whilst the left and right-hand curves of the inserting blades 2, 3 guide the direction of travel of the front tips thereof.

In this case, the intersection angle θ of the inserting blades 2, 3 is set by adjusting the front end angles θ1, θ2 formed by the right and left-hand curves of the inserting blades 2, 3. When the aforementioned inserting action is performed, the inserting blades 2, 3 pass through the hole 6 of the washer 5 and intersect with each other in the region thereof. Since this intersection region is the region of narrowest width, the hole formed in the surface sheet 11a can be reduced in size. When the two mutually intersecting inserting blades 2, 3 abut against and engage with the edge of the hole 6 in the washer 5, a state is assumed wherein the inserting blades 2, 3 fix the washer 5 and surface sheet 11a in position.

Figure 9A:
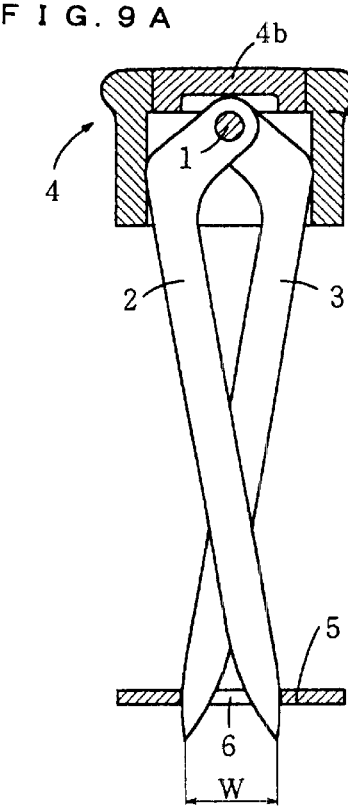
FIG. 9A is a front sectional view of a fixture according to the first embodiment.
Figure 9B:
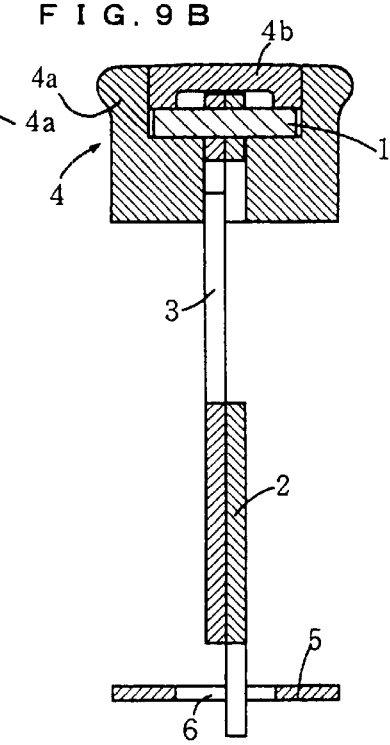
FIG. 9B is a side sectional view of the fixture in FIG. 9A.

In addition to the examples shown in FIG. 7 and FIG. 8, if the cap 4 is constituted by two members, namely, a side face section 4a having a cylindrical outer shape, and a lid section 4b having a flat round shape in plan view, as illustrated in FIG. 9A and FIG. 9B, the two ends of the pivot 1 being held between these two members, then the cap 4 can be installed readily on the pin P section.

Figure 10A:
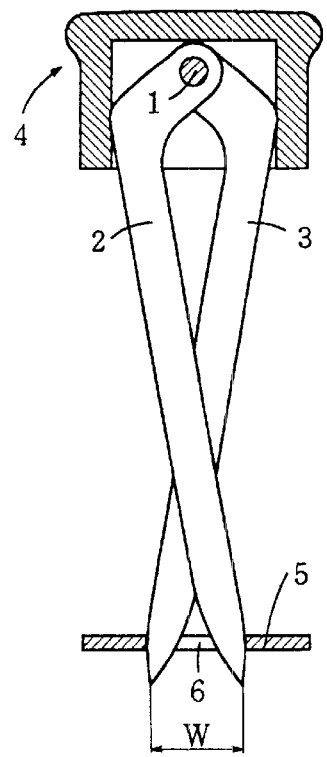
FIG. 10A is a front sectional view showing one modification example of a fixture according to the first embodiment.
Figure 10B:
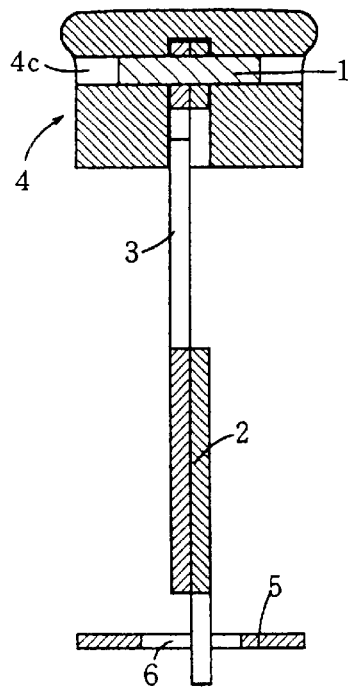
FIG. 10B is a side sectional view of the fixture in FIG. 10A.

Furthermore, if the cap 4 is constituted by a single cap-shaped member, as illustrated in FIG. 10A and FIG. 10B, the two ends of the pivot 1 being held by a pivot hole 4c formed in the cap 4, then the cap 4 has a simple structure and the inserting blades 2, 3 can be attached readily to cap 4.

Figure 11A:
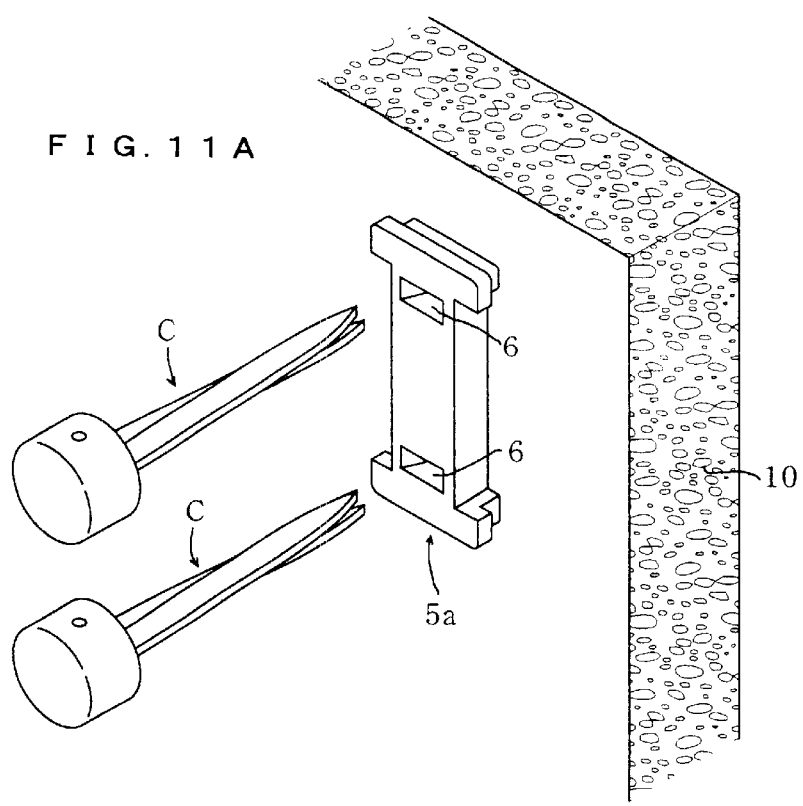
FIG. 11A and FIG. 11B are illustrative diagrams showing an application example of a fixture according to the first embodiment.
Figure 11B:
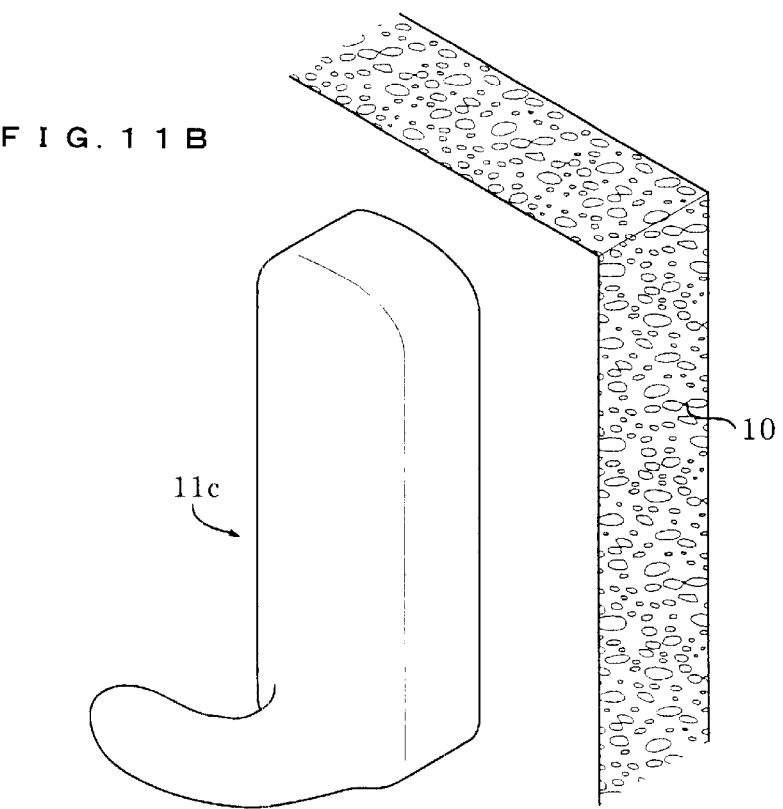

Moreover, in addition to the embodiment illustrated in FIG. 1, the washer 5 may be rectangular two-hole washer 5a, as illustrated in FIG. 11A, wherein two sets of inserting blades 2, 3 are inserted into the two-hole washer 5a to fix the two-hole washer 5a, and then a hanging tool 11c is coupled or fixed to the two-hole washer 5a, as illustrated in FIG. 11B.

It is possible to select a variety of other shapes for the washer 5, depending on the shape of the article 11. For example, as illustrated in FIG. 12, the washer 5 can be designed so that it is composed of a larger diameter section 5f and a smaller diameter section 5g capable of fitting into a hole in the article 11, in view of its outer shape, and it has a hole 6 formed in a tapered shape having an angle approximately matching the insertion direction of the inserting blades 2, 3. With this configuration, the position of the washer 5 and the attitude of the inserting blades 2, 3 can be stabilized while coping with various sizes of a hole in the article 11.

Furthermore, as shown in FIG. 13, the washer 5 may simply be formed with an outer shape constituting a large diameter section 5f and a small diameter section 5g capable of fitting into a hole in the article 11.

Furthermore, as illustrated in FIG. 14, the washer 5 to be fitted into the hole in an article 11 can be designed so that it has a height equal to the thickness of the article 11 and also has an inclined guide section for the inserting blades 2, 3 having an outer shape similar to the inner shape of a hole provided in the article 11.

Similarly to the other examples, a material for the washer 5 may be either steel or hardened synthetic resin. Such a washer 5 is suitable in cases where the article 11 is soft and there is a risk that the article 11 may deform in the region of the hole when it is affixed to the board 10 by the fixture C.

Figure 15:
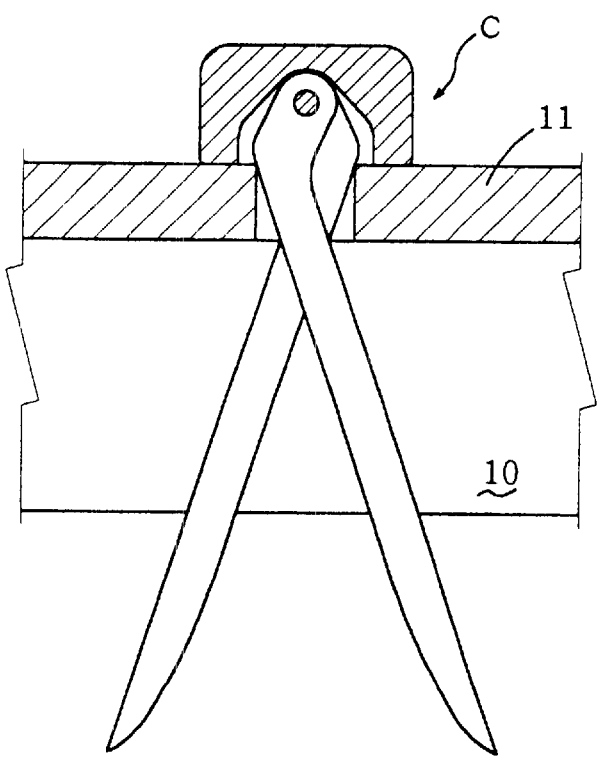
FIG. 15 is an illustrative diagram showing a further application example of a fixture according to the first embodiment.

As illustrated in FIG. 15, if the article 11 is thick and the function of the washer 5 can be provided by forming a hole in the article 11, then the washer 5 becomes unnecessary. The embodiment in FIG. 15 will be described later as a third embodiment.

The fixture C according to the first embodiment is beneficial in that it has a simple structure, it can be attached and detached readily, without requiring a tool, it is reusable, and it does not generate any 'spring back', or rebounding to the original shape, when detached.

A fixture according to a second embodiment of the present invention is now described with reference to FIG. 16 to FIG. 23.

Figure 16:
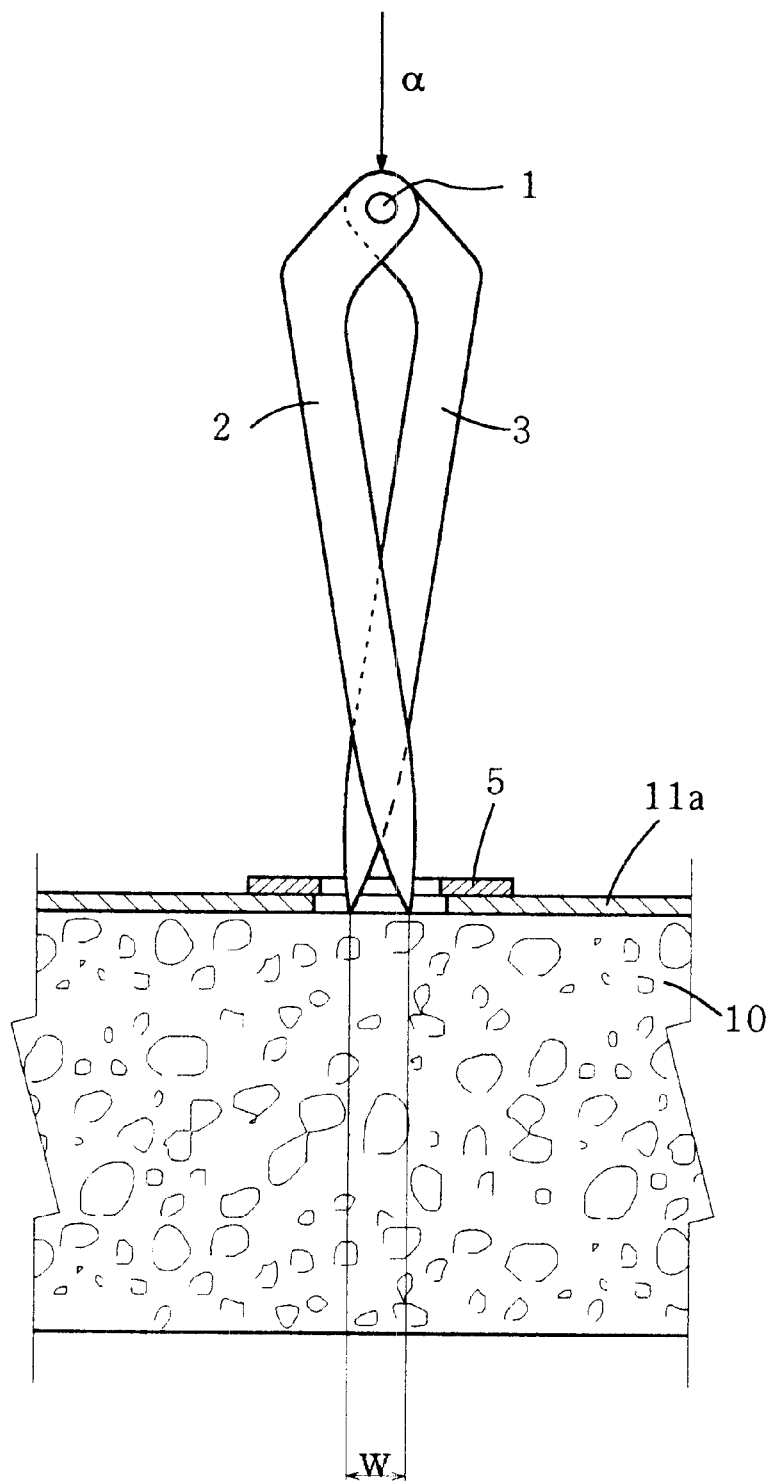
FIG. 16 is a side view of a fixture according to a second embodiment.

The characteristic feature of the present embodiment in contrast to the first embodiment is that it has no cap 4, in other words, it consists only of a pivot 1 and inserting blades 2, 3 supported on this pivot 1. When using this fixture C, in a state where a surface sheet (article to be fixed by the fixture C) 11a has been placed against a board 10 and a washer 5 has been placed on the fixture C, as illustrated in FIG. 16, the sides of the ends 2a, 3a of the inserting blades 2, 3 are pressed directly in the α direction, until the portions of the inserting blades 2, 3 below bend sections 2b, 3b abut against the inner circumference of the hole 6 in the washer 5. In this state, the two inserting blades 2, 3 are embedded firmly in the board 10.

Figure 17:
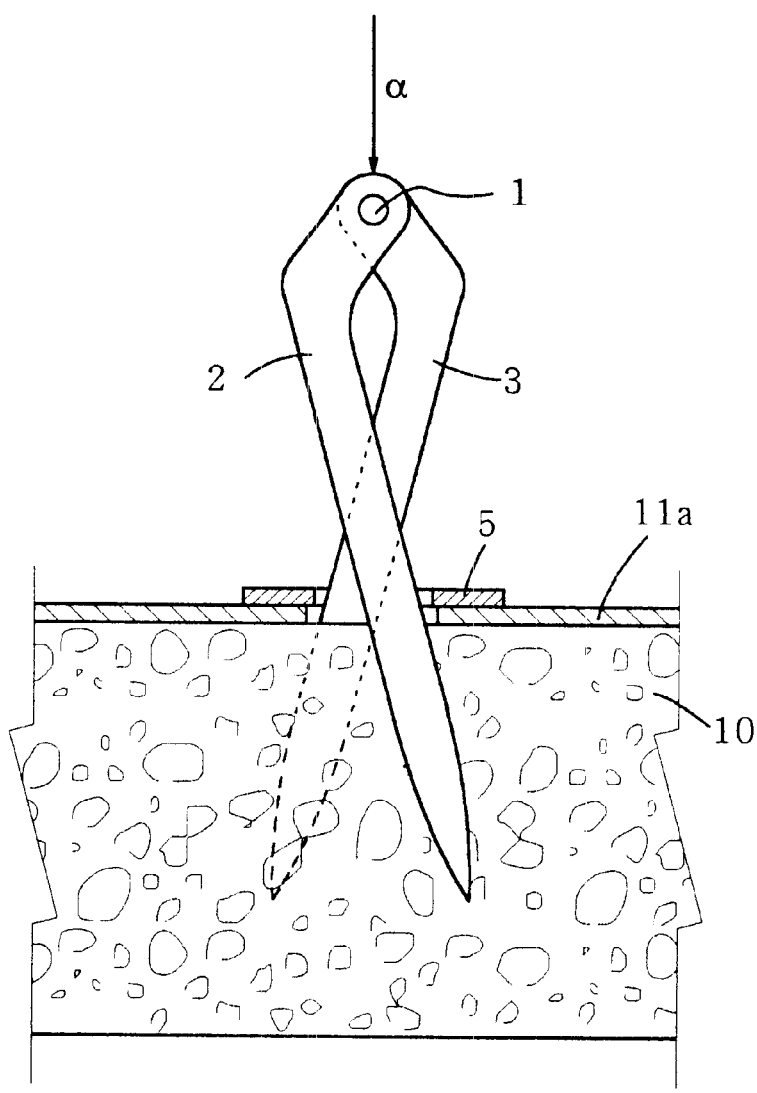
FIG. 17 is an illustrative diagram showing a fixture according to the second embodiment in an intermediate state of insertion.
Figure 18:
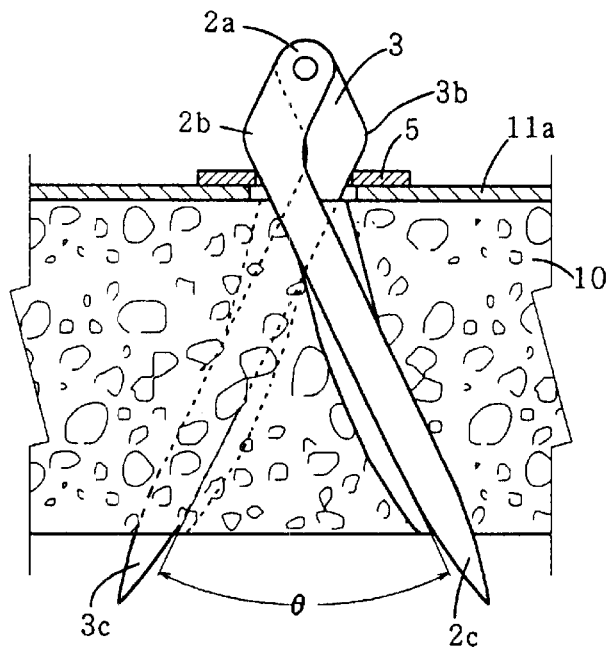
FIG. 18 is a diagram for describing the action of a fixture according to the second embodiment.

FIG. 17 illustrates an intermediate state during insertion of the fixture C. The fixture C is inserted into the board 10 by pressing in the a direction with a finger F. FIG. 18 shows a state where insertion has been completed, the inserting blades 2, 3 being inserted until the portions thereof below the bend sections 2b, 3b abut against the inner circumference of the hole 6 in the washer 5.

Figure 19:
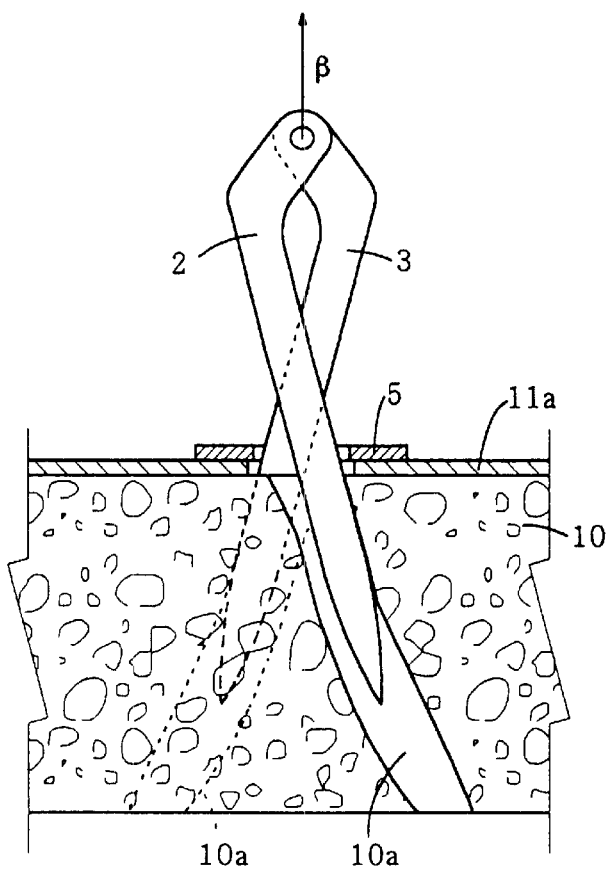
FIG. 19 is an illustrative diagram showing a fixture according to the second embodiment in an intermediate state of detachment.
Figure 20:
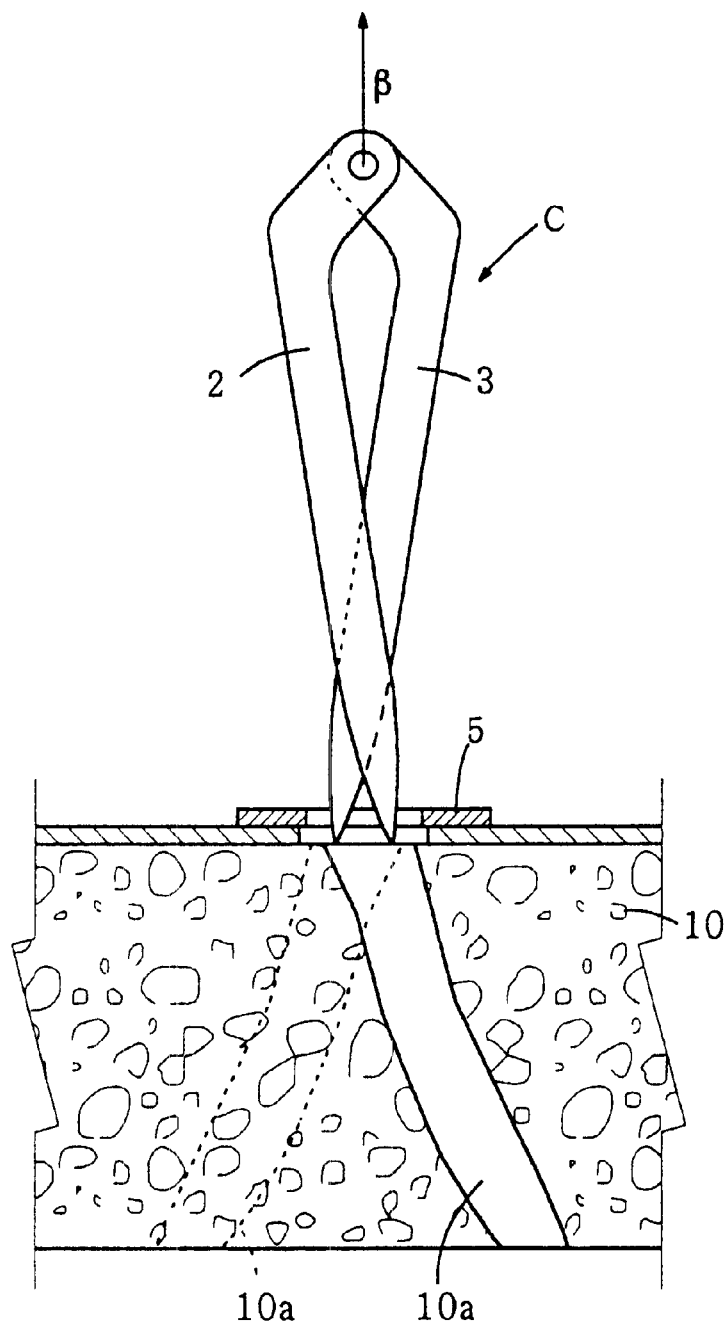
FIG. 20 is an illustrative diagram showing a fixture according to the second embodiment after detachment.

FIG. 19 shows a state where the fixture C is being removed. The fixture C can be removed simply by pulling in the a direction manually, leaving the insertion traces (cavities) 10a, 10a. FIG. 20 shows a state after the pin P has been removed completely from the board 10.

Figure 21A:
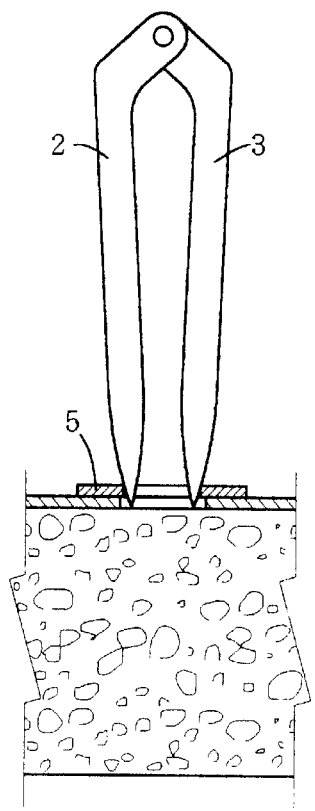
FIG. 21A to FIG. 21C are illustrative diagrams showing various insertion attitudes of a fixture according to the second embodiment.
Figure 21B:
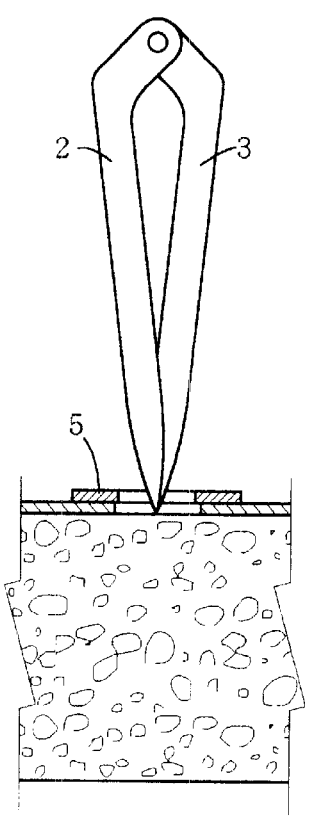
Figure 21C:
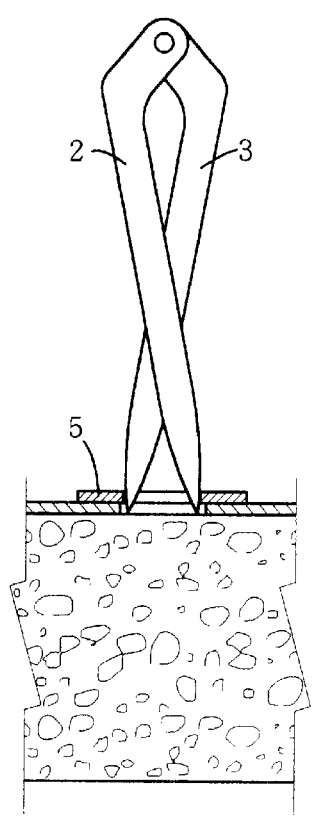

When the aforementioned fixture C is inserted into the board 10, the attitude of the inserting blades 2, 3 can be selected variously, but it is suitable to arrange the ends 2c, 3c of the inserting blades 2, 3 mutually apart, as illustrated in FIG. 21A, in case where the board is relatively hard. Moreover, those ends 2c, 3c may be mutually aligned as shown in FIG. 21B, or it is suitable to arrange those ends 2c, 3c intersecting each other, as shown in FIG. 21C, in case where the board is relatively soft.

Figure 22:
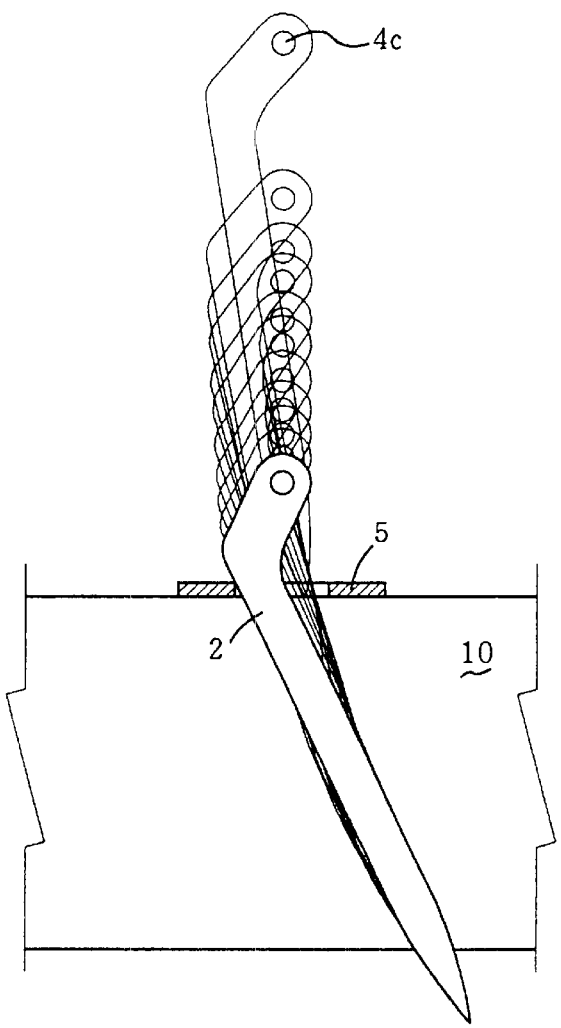
FIG. 22 is an illustrative diagram showing the path of the inserting blades when a fixture according to the second embodiment has been inserted.

The insertion path of the inserting blades 2, 3 is now described. As the pivot hole 4c moves down perpendicularly towards the board 10, as illustrated in FIG. 22, inserting blade 2 is guided by the washer 5 and rotates slightly as it becomes embedded in the board 10. In this case, the smaller the cavity created by the insertion path when the fixture C is completely inserted, the lower the resistance to insertion (the same applies to insertion blade 3).

Figure 23:
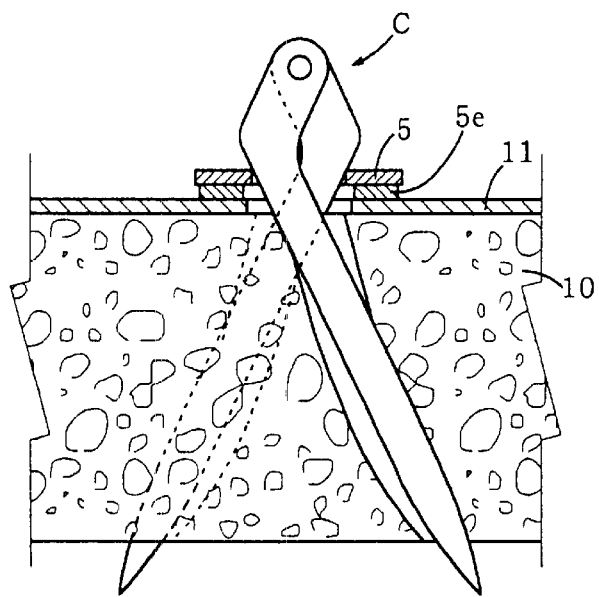
FIG. 23 is an illustrative diagram showing one modification example of a washer for a fixture according to the second embodiment.

FIG. 23 shows a modification of the second embodiment, wherein a cushion plate 5e made from an elastic material is interposed between the washer 5 and the article 11. By means of this cushion plate 5e, not only is the article 11 supported and fixed elastically, but any vibrations in the board 10 and/or the article 11 are absorbed and hence resonance effects can be prevented and accidental detachment of the fixture C can be further prevented.

The fixture according to a third embodiment of the present invention is now described with reference to FIG. 24 to FIG. 26.

The fixture C according to the present embodiment differs from the first embodiment only in that no washer 5 is provided. In other words, the fixture C consists of a pin P only. However, articles 11 for which the fixture C according to the present embodiment can be applied are limited to ones having a hole therein which can also perform the function of the hole of the washer 5.

Figure 24:
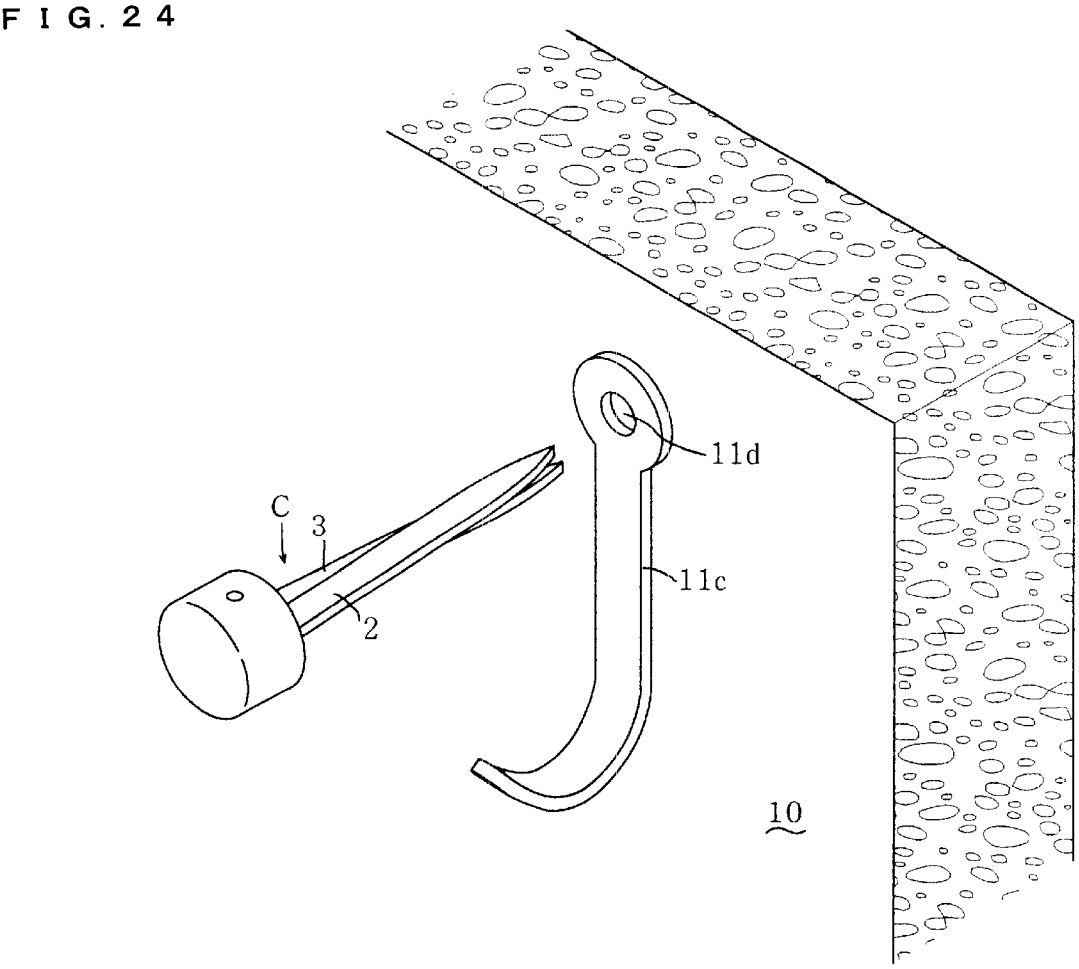
FIG. 24 is an oblique view of a fixture according to a third embodiment of the present invention.

More specifically, as illustrated in FIG. 24, a hole 11d is provided at the upper end of the hanging tool 11c and is caused to perform the function of the washer 5, with the result that the washer 5 is not required. The lower portion of the hanging tool 11c is formed in a curved shape.

Figure 25:
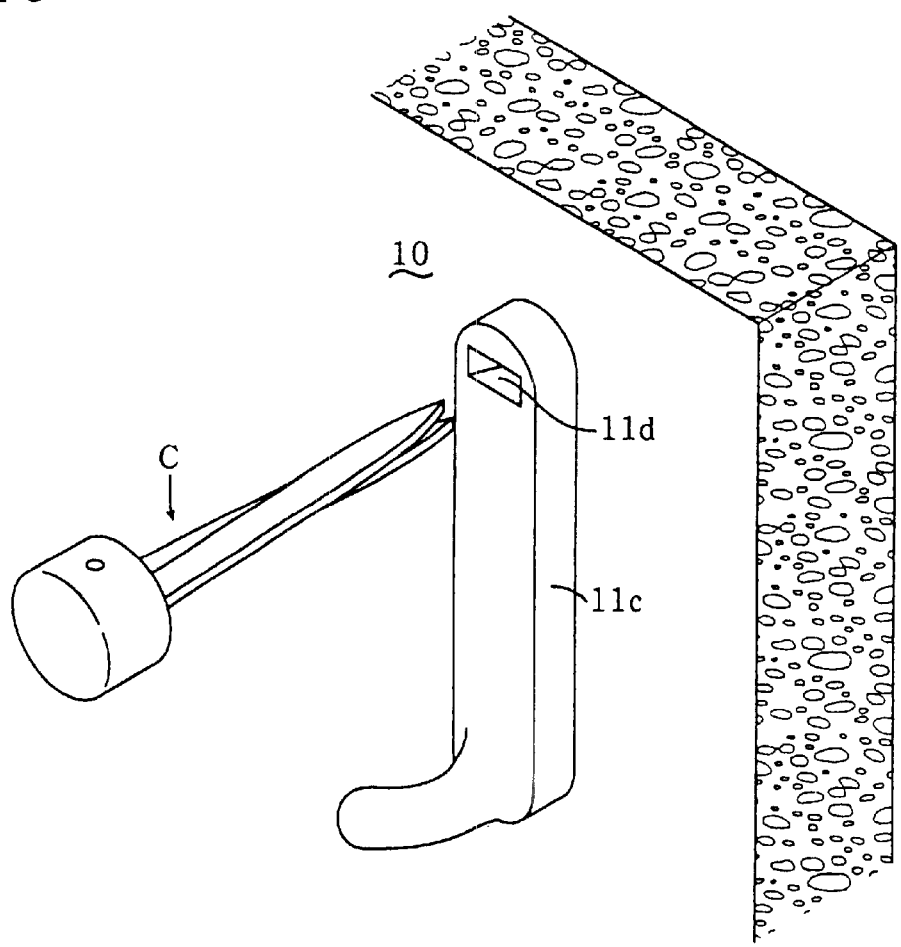
FIG. 25 is an oblique view showing a modification example of a fixture according to the third embodiment.

FIG. 25 shows a further example wherein a washer 5 is not required. As illustrated in the figure, a long rectangular hole 11d is provided in the upper end portion of a hanging tool 11c which is long in the vertical direction. The fixture C for an article is inserted manually into this hole 11*d*. The operation for retracting the fixture C is the same as in the case of the first embodiment and second embodiment described above.

Figure 26:
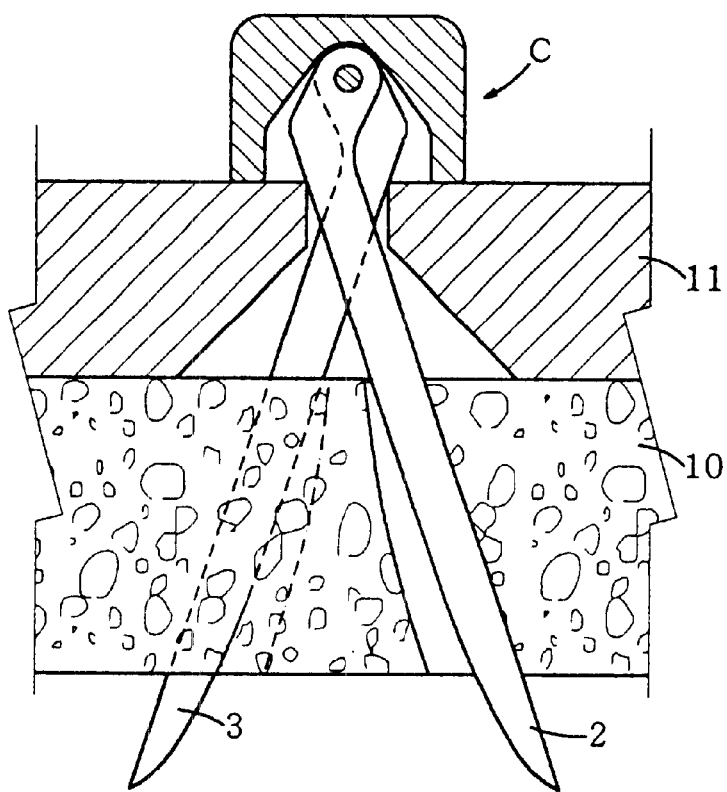
FIG. 26 is an illustrative diagram showing an application example of a fixture according to the third embodiment.

FIG. 26 shows yet a further example wherein a washer 5 is not required. In this case, the article 11 is thick and if the inserting blades 2, 3 cannot be opened sufficiently, the insertion hole in the article 11 should be widened in a tapering fashion.

The actual dimensions of the fixture C (lengths, thickness, angles, and the like) according to the second embodiment and third embodiment are essentially the same as those for the first embodiment.

The first to third embodiments of the present invention were described above, and here an example of a specific application of the fixture C according to the first embodiment is described with reference to FIG. 27A to FIG. 27C.

Figure 27A:
FIG. 27A to FIG. 27C are sectional diagrams illustrating a variety of application examples of a fixture according to the present invention.

FIG. 27A shows the case where a top plate 11*e*, such as a ceiling board, is attached perpendicularly to a vertical board 10, such as a residence wall, by fixing an L-shaped bracket 5*c* supporting the ceiling board lie to the top plate lie and the board 10 by means of fixtures C, C. In this case, by inserting the inserting blades 2, 3 in such a manner that they cross and open in the horizontal direction, it is possible to support the weight of the ceiling board 11*e* across the full width of the two inserting blades 2, 3, thereby providing significant supporting force. This feature applies similarly to the application example in FIG. 27C, described hereinafter. In this application example, the L-shaped bracket 5*c* is held securely by fixtures C, C, thereby making it possible to support the ceiling board 11*e*.

Figure 27B:
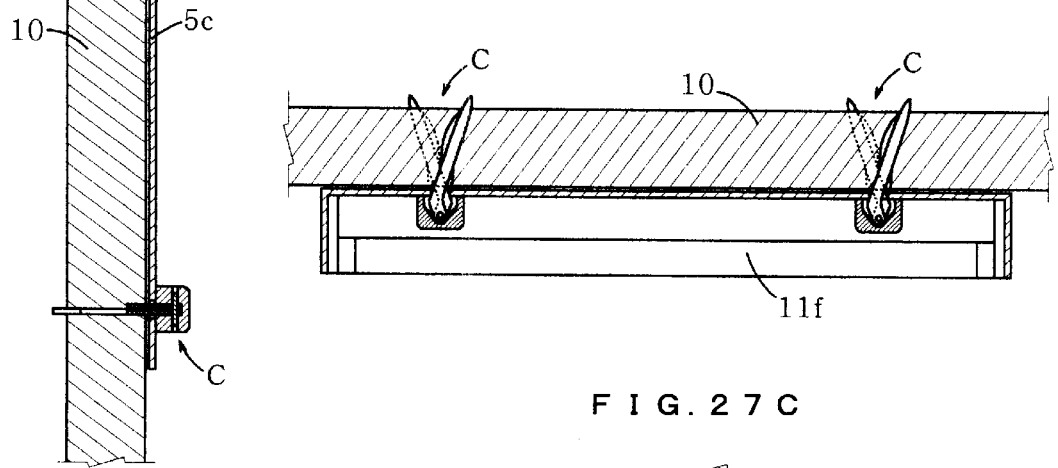

FIG. 27B shows a case where an installation frame 11*f* for lighting instrument (as an article to be fixed by fixture C), such as a fluorescent lamp, is attached to the lower face of a horizontal board 10, such as a ceiling board. Significant holding force can be obtained simply by inserting fixtures C, C through holes provided in the installation frame 11*f* itself, thereby making it possible to attach the installation frame (article) 11*f* to the board 10 in a secure fashion.

Figure 27C:
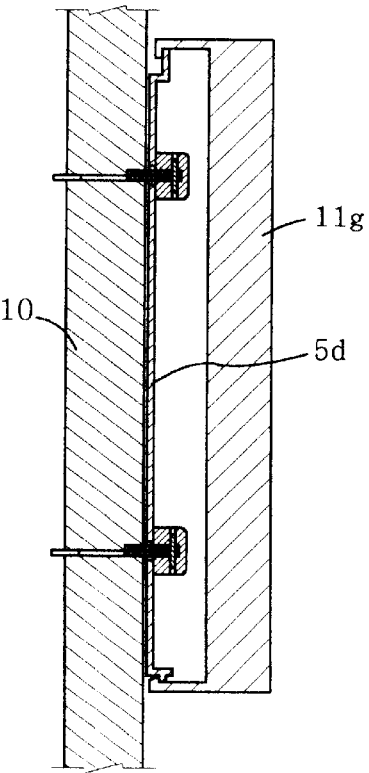

FIG. 27C shows a case where an installation frame 11*g* for an internal air conditioning unit is attached to a vertical board 10, such as a residence wall, using a coupling bracket 5*d*. The coupling bracket 5*d* is formed with coupling edge sections in the upper and lower edges thereof, along with holes for introducing inserting blades 2, 3. The installation frame 11*g* is coupled to the aforementioned coupling edge sections.

Figure 28A:
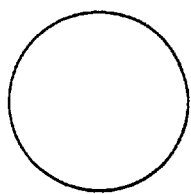
FIG. 28A to FIG. 28K is an illustrative diagram showing a variety of shapes of a washer constituting a fixture, or a hole in an article, according to the first embodiment or the second embodiment.
Figure 28B:
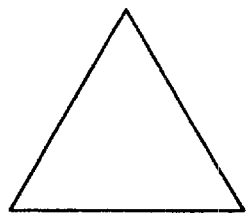
Figure 28C:
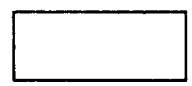
Figure 28D:
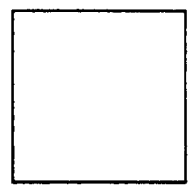
Figure 28E:
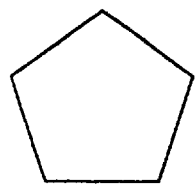
Figure 28F:
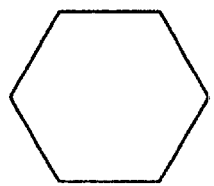
Figure 28G:
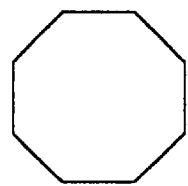
Figure 28H:
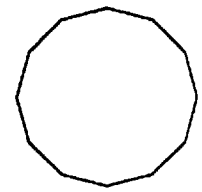
Figure 28I:
Figure 28J:
Figure 28K:

In the respective embodiments described above, the shape of the hole 6 of the washer 5 in plan view is round, as illustrated in FIG. 28A, or rectangular, as illustrated in FIG. 28C, but in addition to these shapes, the hole 6 may be of various shapes, such as a triangular shape, as illustrated in FIG. 28B, a square shape (FIG. 28D), a polygonal shape (FIG. 28E to FIG. 28H), or a combination of rectangular shapes (FIGS. 28I to 28K). The shapes illustrated in FIG. 28A to FIG. 28K may also be adopted for the shape of a hole in the article 11.

Moreover, in a circumstance where a board 10 and/or an article 11 to be fixed is subjected to repeated vibrations, it is desirable that a washer 5 or the vicinity of the hole of the article 11 is made of an elastic material, thus absorbing the vibrations and preventing gradual detachment of the pin P. On the other hand, it is desirable that the pivot 1 is made of material having a little elasticity and constituted so as not to show an appreciable elasticity.

Moreover, in the description and the drawings relating to the respective foregoing embodiments, the ends 2*c*, 3*c* of the inserting blades 2, 3 are illustrated as completely going through the board, but these ends 2*c*, 3*c* do not necessarily have to go through the board 10 completely. Rather, if the length of the inserting blades 2, 3 is set to a dimension whereby they remain inside a board (for example, a light aerated concrete board) 10 when inserted, then only a small force is required for inserting the blades 2, 3, and hence ease-of-use is improved, although the durability is lowered (by approximately 40%).

For a board 10 which is relatively thick by nature, such as aerated light concrete board, the inserting blades 2, 3 remain inside the board 10. But in case where the present invention is applied to relatively thin plaster board, the inserting blades 2, 3 can be set to a relatively short length, corresponding to the thickness of the plaster board.

Figure 29:
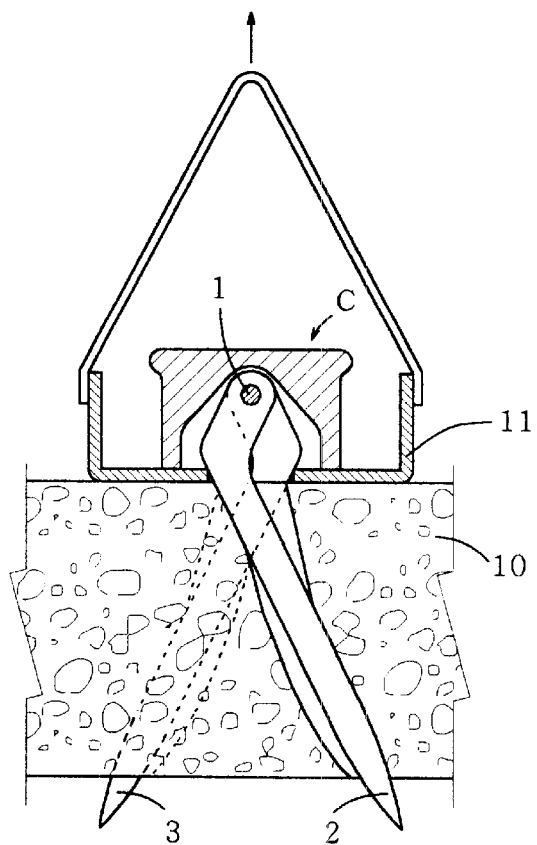
FIG. 29 is an illustrative diagram showing a first withdrawal test (withdrawal force in the opposite direction to the direction of insertion) for a fixture according to the present invention.
Figure 30:
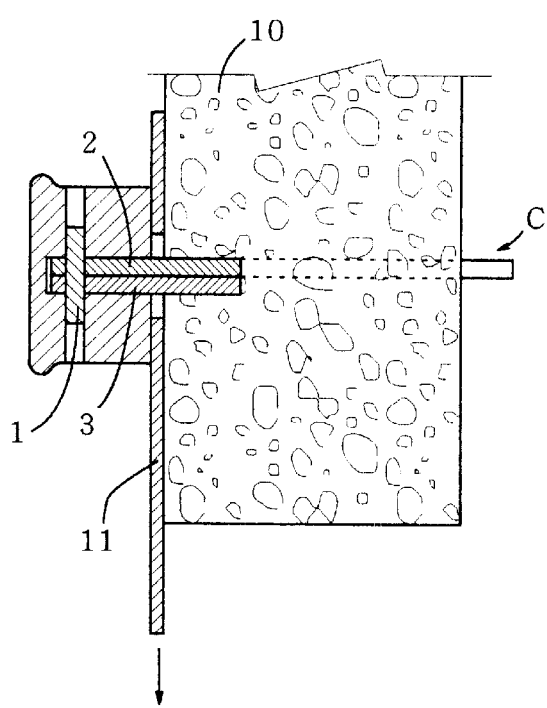
FIG. 30 is an illustrative diagram showing a second withdrawal test (withdrawal force in a parallel direction to the longitudinal direction of the pivot) for a fixture according to the present invention.

FIG. 29 illustrates the results of a first withdrawal test for an article 11 fixed by a fixture C according to the second embodiment. In this first withdrawal test, the amount of pulling force required in the opposite direction to the direction in which the fixture C is inserted is measured. Accordingly, when a load was applied in the direction of the arrow to an article 11 fixed to a 9 mm-thick plaster board (board) 10, then a maximum durability of 10.3 kg was recorded. The durability for a standard thumb tack in the same test was 1 kg.

What is claimed is:

1. A fixture for an article, comprising:

a pin consisting of a single pivot and a pair of inserting blades, one end of each inserting blade being supported rotatably by means of said pivot and the other ends thereof being formed into sections for inserting into a board; and a washer having a hole through which said pair of inserting blades are passed;

wherein the pair of inserting blades of said pin open up mutually while being inserted into the board, and when pulling force is applied to the washer, the inserting blades of the fixture act to open mutually, with the result that the fixing force of the fixture is increased.

2. The fixture for an article according to claim 1, wherein on inner edge region and an outer edge region of said inserting sections are formed in a linear shape or a curved shape.

3. The fixture for an article according to claim 1, wherein a cap for holding the pivot is attached to said pin, and a knob section is provided on said cap.

4. A fixture for an article, comprising: a pin consisting of a single pivot and a pair of inserting blades, one end of each inserting blade being supported rotatably by means of said pivot and the other ends thereof being formed into sections for inserting into a board; and a washer having a hole through which said pair of inserting blades are passed; wherein
the pair of inserting blades of said pin open up mutually when inserted into the board, and
said pair of inserting blades are elongated members which are bent in an intermediate position to form an approximate V shape.

5. A fixture in combination with an article, having a hole therein, for fixing the fixture to a plaster board surface, comprising:

a pin including a pair of inserting blades, one end of each of the inserting blades being formed into a section for inserting into the plaster board, wherein said one end sections intersect when inserted into the plaster board and the pin is configured such that an intersection angle between said one end sections of the inserting blades for inserting into the plaster board becomes wider as the pin is inserted deeper into the plaster board with the inserting blades intersecting, when passing through the hole formed in the article, while the pin is being inserted into the plaster board, and when pulling force is applied to the article flexed by the fixture, the inserting blades of the fixture act to open mutually, with the result that fixing force of the fixture is increased.

6. A fixture, in combination with an article having a hole, comprising:

a pin consisting of a single pivot and a pair of inserting blades, one end of each inserting blade being supported rotatably by means of said pivot and the other ends thereof being formed into sections for inserting into a board;

wherein the pair of inserting blades of said pin open up mutually while being inserted through the hole formed in the article and into the board, and wherein a cap for holding the pivot is attached to said pin, and a knob section is provided on said cap.

7. A fixture for an article, comprising:

a pin consisting of a single pivot and a pair of inserting blades, one end of each inserting blade being supported rotatably by means of said pivot and the other ends thereof being formed into sections for inserting into a board; wherein the other ends of the pair of inserting blades of said pin are configured to open up mutually so as to diverge away from each other while the pin is being inserted into the board, and said pair of inserting blades are elongated members which are bent in an intermediate position to for an approximate V shape.

* * * * *